(12) United States Patent
Wakayama et al.

(10) Patent No.: US 8,942,735 B2
(45) Date of Patent: Jan. 27, 2015

(54) NETWORK SYSTEM AND COMMUNICATION LOG ANALYZER

(75) Inventors: Koji Wakayama, Yokohama (JP); Kunihiko Toumura, Hachioji (JP); Yukiko Takeda, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 13/370,346

(22) Filed: Feb. 10, 2012

(65) Prior Publication Data

US 2012/0254409 A1    Oct. 4, 2012

(30) Foreign Application Priority Data

Apr. 1, 2011 (JP) ................... 2011-081386

(51) Int. Cl.
*H04W 24/00* (2009.01)
*H04W 64/00* (2009.01)
*H04W 36/22* (2009.01)
*H04W 36/32* (2009.01)

(52) U.S. Cl.
CPC ............ *H04W 64/006* (2013.01); *H04W 36/22* (2013.01); *H04W 36/32* (2013.01)
USPC .................. 455/456.5; 455/456.1; 455/456.2; 455/456.3

(58) Field of Classification Search
USPC .............................................. 455/456.1–457
See application file for complete search history.

(56) References Cited

U.S. PATENT DOCUMENTS

| | | | |
|---|---|---|---|
| 6,999,777 B1* | 2/2006 | Ganesh | 455/456.1 |
| 2002/0109716 A1* | 8/2002 | Henderson et al. | 345/744 |
| 2005/0064879 A1* | 3/2005 | McAvoy | 455/456.1 |
| 2008/0062910 A1 | 3/2008 | Matsui et al. | |
| 2008/0227402 A1* | 9/2008 | Kaneda et al. | 455/68 |
| 2009/0247147 A1* | 10/2009 | Hadinata et al. | 455/421 |
| 2010/0085904 A1* | 4/2010 | Hamaue et al. | 370/311 |
| 2011/0210845 A1 | 9/2011 | Xiong et al. | |

FOREIGN PATENT DOCUMENTS

| | | |
|---|---|---|
| CN | 1867176 A | 11/2006 |
| CN | 101370249 A | 2/2009 |
| EP | 1 876 851 A1 | 1/2008 |
| JP | 2000-113393 A | 4/2000 |

(Continued)

OTHER PUBLICATIONS

Chinese Office Action dated Apr. 24, 2014 (6 pages).

(Continued)

*Primary Examiner* — Olumide T Ajibade Akonai
*Assistant Examiner* — Jaime Holliday
(74) *Attorney, Agent, or Firm* — Crowell & Moring LLP

(57) ABSTRACT

This invention provides an apparatus that associates a location where a terminal uses communication or travel route in use of the communication, with a connection destination of the terminal. The apparatus includes a communication log analyzer that aggregates communication logs collected by network apparatuses that constitute the mobile network and analyzes it. The communication log analyzer estimates travel route of the terminal connected the network using: log information generated by a base station to be connected to the terminal at the time of starting the connection, log information generated by a base station to be connected to the terminal at the time of a handover of the connection, and log information generated by a base station connected to the terminal at the time of detaching the connection.

9 Claims, 16 Drawing Sheets

(56) References Cited

FOREIGN PATENT DOCUMENTS

| | | |
|---|---|---|
| JP | 2000-324246 A | 11/2000 |
| JP | 2003-199135 A | 7/2003 |
| JP | 2006-245821 A | 9/2006 |
| JP | 2008-72368 A | 3/2008 |
| JP | 2008-283256 A | 11/2008 |
| JP | 2008-299556 A | 12/2008 |
| JP | 2010-81551 A | 4/2010 |
| WO | WO 2009/001400 A1 | 12/2008 |

OTHER PUBLICATIONS

Japanese Office Action dated Sep. 2, 2014, including English translation (eight (8) pages).

* cited by examiner

| BASE STATION | LINE INFORMATION | | |
|---|---|---|---|
| 1000 | A RAIL ROAD | B RAIL ROAD | NATIONAL ROAD Rn |
| 1001 | A RAIL ROAD | | NATIONAL ROAD Rn |
| 1002 | A RAIL ROAD | | |
| 1003 | B RAIL ROAD | | |
| | | | |

| BASE STATION | 1000 | 1001 | 1002 | 1003 |
|---|---|---|---|---|
| 1000 | | | | |
| 1001 | 2 km | | | |
| 1002 | 4 km | 6 km | | |
| 1003 | 6 km | 8 km | 10 km | |

| TERMINAL A | | TERMINAL B | |
|---|---|---|---|
| TIME | BASE STATION | TIME | BASE STATION |
| 8:00 | 1000 | 8:05 | 1010 |
| 8:02 | 1001 | 8:09 | 1011 |
| 8:04 | 1002 | 8:13 | 1012 |
| | | | |

| BASE STATION | TERMINAL ID | CELL INFORMATION | SECTOR INFORMATION | CONNECTION TIME | HANDOVER TIME | DETACH TIME |

| APPARATUS (AAA) | SESSION ID | USER ID | IP ADDRESS | AUTHENTICATION TIME |

| APPARATUS (PROXY SERVER) | IP ADDRESS | DESTINATION INFORMATION | HTTP SESSION START TIME | HTTP SESSION RELEASE TIME |

| APPARATUS (P-GW) | GRE KEY | TERMINAL IP ADDRESS | TIME |

| APPARATUS (S-GW) | TERMINAL ID | GRE KEY | TIME |

| APPARATUS (HSS) | TERMINAL ID | TIME |

| BASE STATION | S-GW | P-GW |
|---|---|---|
| HARDWARE ID | GRE KEY | IP ADDRESS |

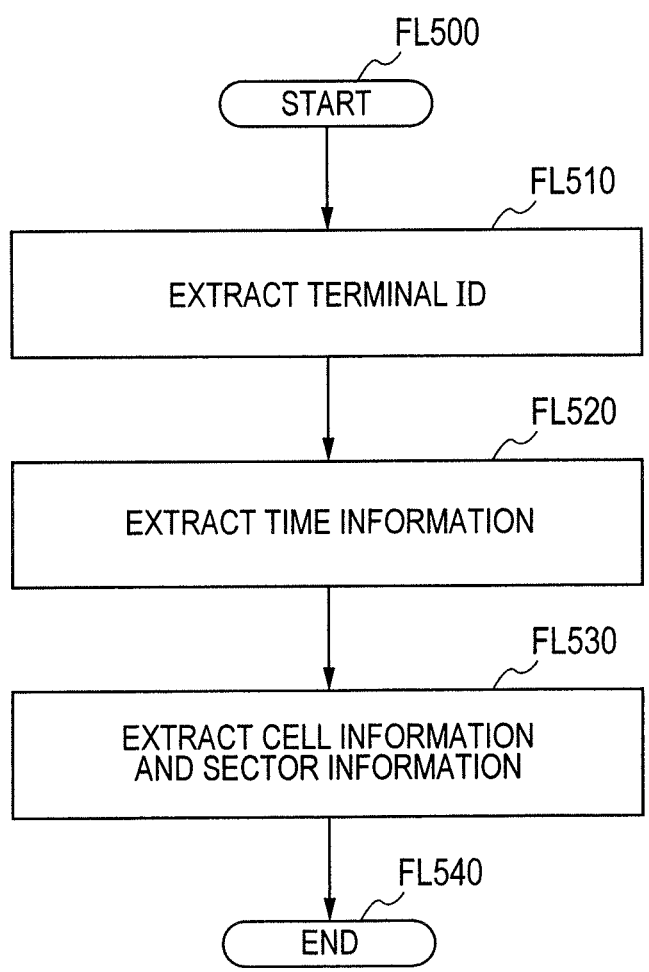

NETWORK SYSTEM AND COMMUNICATION LOG ANALYZER

CLAIM OF PRIORITY

The present application claims priority from Japanese patent application JP2011-081386 filed on Apr. 1, 2011, the content of which is hereby incorporated by reference into this application.

BACKGROUND OF THE INVENTION

The present invention relates to an apparatus that analyzes communication log information generated by a communication apparatus in a mobile network.

In mobile communication, a communication method referred to as 3rd Generation is introduced to increase communication speed. Main use of communication is shifted from conventional voice communication to data communication. Nowadays, technology development for a communication method referred to as 4th Generation is being promoted to achieve transmission rate of 100 s of Mbit/s to several Gbit/s as fast as wired communication using optical fiber.

On the other hand, terminals in mobile communication have been sophisticated along with increase in communication speed. In conventional mobile communication, the terminals with voice communication function and simple Internet access functions only had been largely used. Nowadays, terminals with sophisticated information processing functions called "smart phone" have been increasing in proportion.

In the sophisticated terminal of smart phone, a wide variety of application programs are available. Compared with the conventional mobile phone terminal, communication volume flowing in a wireless access network significantly increases. This necessitates a solution to reduce the load of the wireless access network.

One method for reducing load of the wireless access network employs offload technology of traffic. The offload technology makes traffic of mobile terminals to bypass a wireless access network and to go through a wired network, so as to reduce load of the wireless access network. Implementation of the offload includes: a method using wireless LAN; a method in which an extremely-compact base station called femtocell is installed at home so as to transfer traffic from the base stations via a optical access network to Internet; and a method for reducing traffic flowing of contents such as video delivery in the wireless access network using: cache technology; and locating contents delivery dedicated network referred as Contents Delivery Network (CDN) close to the terminals.

BRIEF SUMMARY OF THE INVENTION

In business models of the conventional mobile communication, telecommunication carriers operate networks and determine the service specification for the network. Based on this specification, the traffic volume on the network was predicted to design and build the network.

However, smart phones allow users freely to develop applications. Additionally, the users can freely share developed applications between the users to use them. This is shifting the main provider of service from telecommunication carriers to terminal suppliers and service providers. This makes the prediction of traffic volume on the network by telecommunication carriers more difficult than that in the past.

In order to ensure traffic offload, telecommunication carriers need to know network usage accurately.

Associating location and travel route of a terminal with a communication destination used at the location and the travel route is effective in: locating offload cache and CDN; and designing a network that offloads to a wired network using wireless LAN access.

Obtaining location information of the terminal includes use of Global Positioning System (GPS) function on the mobile phone and the smart phone. Using GPS function of the terminal to analyze location information requires that the terminal with the GPS function is always turned on. That is, the terminal is required to: use the GPS function at regular intervals to measure location information at the time; and provide the location information to a carrier who collects location information (usually, a telecommunication carrier operating the mobile network). This causes increased power consumption of the terminal, thus consuming a battery faster. Further, obtaining location information using the GPS function is not associated with communication usage. Thus the carrier is always required to collect location information of the terminal regardless of use of the communication of the terminal. This poses following problems. The first problem is increased information volume collected by a system. The second problem is necessity of association of location information of the terminal in communication use only with communication use among enormous volume of information when associating them. This causes increased throughput for the association.

WO 2009/001400 discloses a method for estimating a travel route and a travel direction of a terminal. Unfortunately, the disclosed invention aims to achieve low power consumption, while this does not disclose a method for associating a location and a connection destination of the terminal in order to predict traffic volume.

In order to achieve the above-described object, according to one aspect of the present invention, a network system includes: plural communication units; and a communication log analyzer configured to connect the plural communication units via a network. The plural communication units generate communication log information, and transmit the generated communication log information to the communication log analyzer. The communication log analyzer may be configured to extract communication log information of communication between each of at least two communication units and a given terminal, from the communication log information received from the plural communication units. The extracted communication log information is used to estimate a travel direction of the given terminal.

The communication units may include a base station. The terminal wirelessly connects the base station. The communication log analyzer may be configured to extract at least one of a first communication log information and a second communication log information. The first communication log information is generated by the base station when the terminal connects to the base station. The second communication log information is generated by the base station when the terminal disconnects the connection to the base station.

The communication log analyzer may be configured to use the extracted communication log information and distance information between the respective base stations so as to estimate a travel distance of the terminal.

The communication log analyzer may be configured to: calculate a travel time from a generation time in the extracted communication log information, the travel time being required for the terminal to travel between the base stations; and estimate a travel speed of the terminal from the travel distance and the travel time.

The communication log analyzer may be configured to estimate at least one of a travel route and a travel method from at least one of route information, the travel speed, and the travel direction, the route information including information on routes within each of transmission ranges of the respective base stations.

The communication units may include: a base station connected to the terminal; and a proxy server being connected when the terminal connects to a WEB server, and the communication log analyzer may be configured to associate third communication log information generated by the proxy server, the travel route, and the travel method. The third communication log information includes information on the WEB server connected to the terminal.

The present invention ensures estimation of a travel direction and other information of the terminal without using the GPS. This reduces information volume for estimating the travel direction and other information of the terminal compared with the use of the GPS.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a table of an exemplary configuration of a route information table stored in a base station information database;

FIG. 9 is a table of an exemplary configuration of a distance table stored in the base station information database;

FIG. 10 is a table of an exemplary configuration of a terminal trace table stored in a location information processor;

FIG. 13 is a diagram illustrating an exemplary communication log information generated by the base station when the terminal is connected to the base station, executes a handover to the base station, and is disconnected from the base station;

FIG. 14 is a diagram illustrating an exemplary communication log information generated by an AAA server;

FIG. 15 is a diagram illustrating an exemplary communication log information generated by a proxy server;

FIG. 16 is a diagram illustrating an exemplary communication log information generated by the P-GW;

FIG. 17 is a diagram illustrating an exemplary communication log information generated by the S-GW;

FIG. 18 is a diagram illustrating an exemplary communication log information generated by the HSS;

FIG. 19 is a table of an exemplary configuration of a table used for mapping terminal information;

FIG. 23 is a flowchart illustrating an exemplary procedure for generating the terminal trace table.

DETAILED DESCRIPTION OF THE INVENTION

Embodiments of the present invention will be described below by referring to the accompanying drawings.

Figure 1:
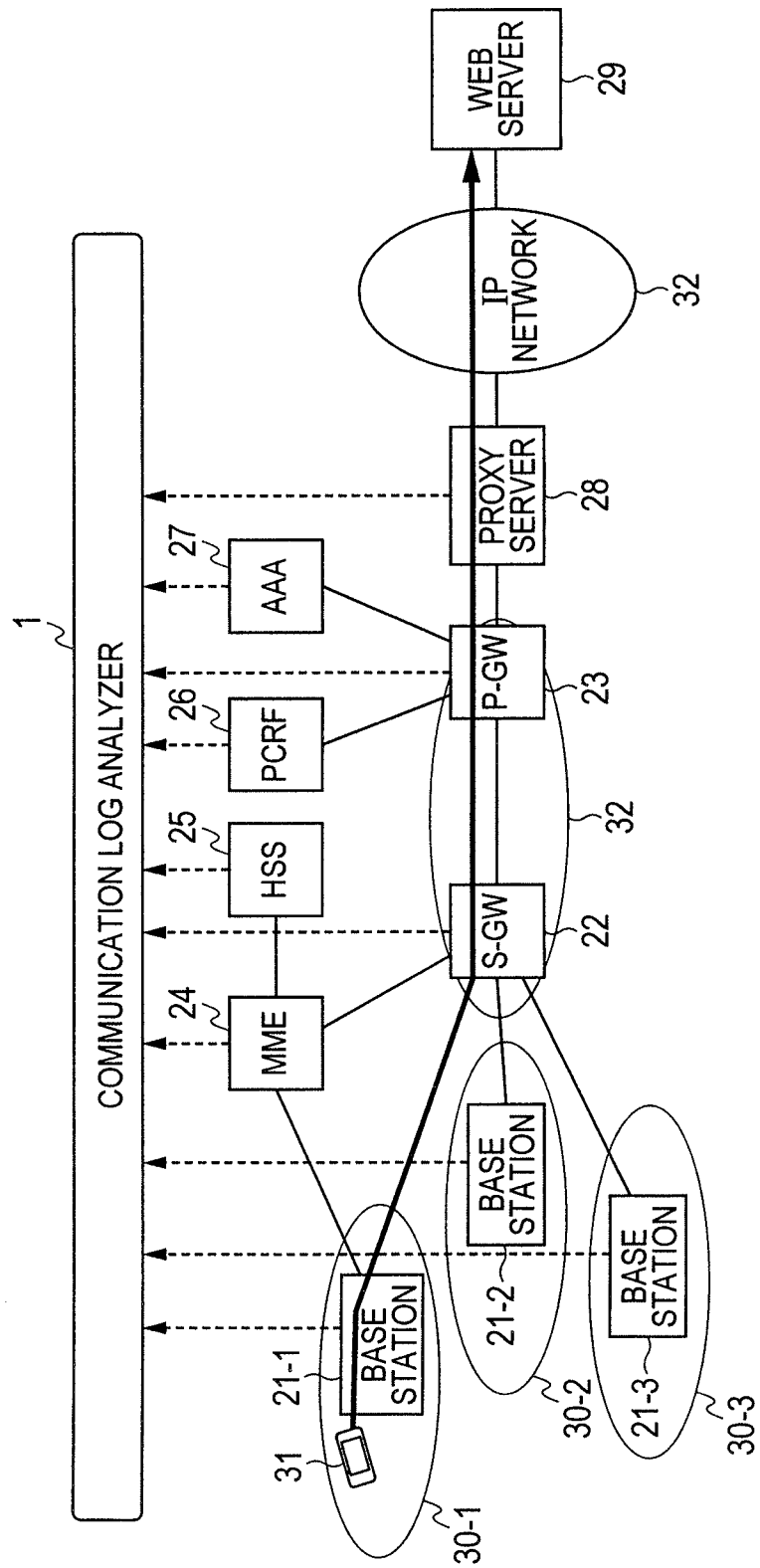
FIG. 1 is a diagram illustrating an exemplary configuration of a network according to an embodiment of the present invention.

FIG. 1 is a diagram illustrating an exemplary configuration of a network according to the embodiment of the present invention. In particular, FIG. 1 shows an exemplary network of the Long Term Evolution (LTE).

An exemplary configuration of the network according to the embodiment of the present invention includes a communication log analyzer 1, a terminal 31, base stations 21, a Serving Gateway (S-GW) 22, which controls packet transfer, a Packet Data Network Gateway (P-GW) 23, which is a connection point at Internet side, a mobility management entity 24, which processes as mobility management of terminals and the like, a Home Subscriber Server (HSS) 25, which controls user subscription information and the like, a Policy and Charging Rules Function (PCRF) 26, which determine policy of charging rules and the like, an Authentication, Authorization, and Accounting (AAA) Server 27, a proxy server 28, which relays between the wireless network 30 and Internet (IP Network) 32, and a Web server 29, which is a connection destination of the terminal.

The present invention may be applied to not only the LTE but also to another mobile communication method such as Worldwide Interoperability for Microwave Access (WiMAX), a 3rd-Generation mobile communication method of CDMA2000.

Figure 2:
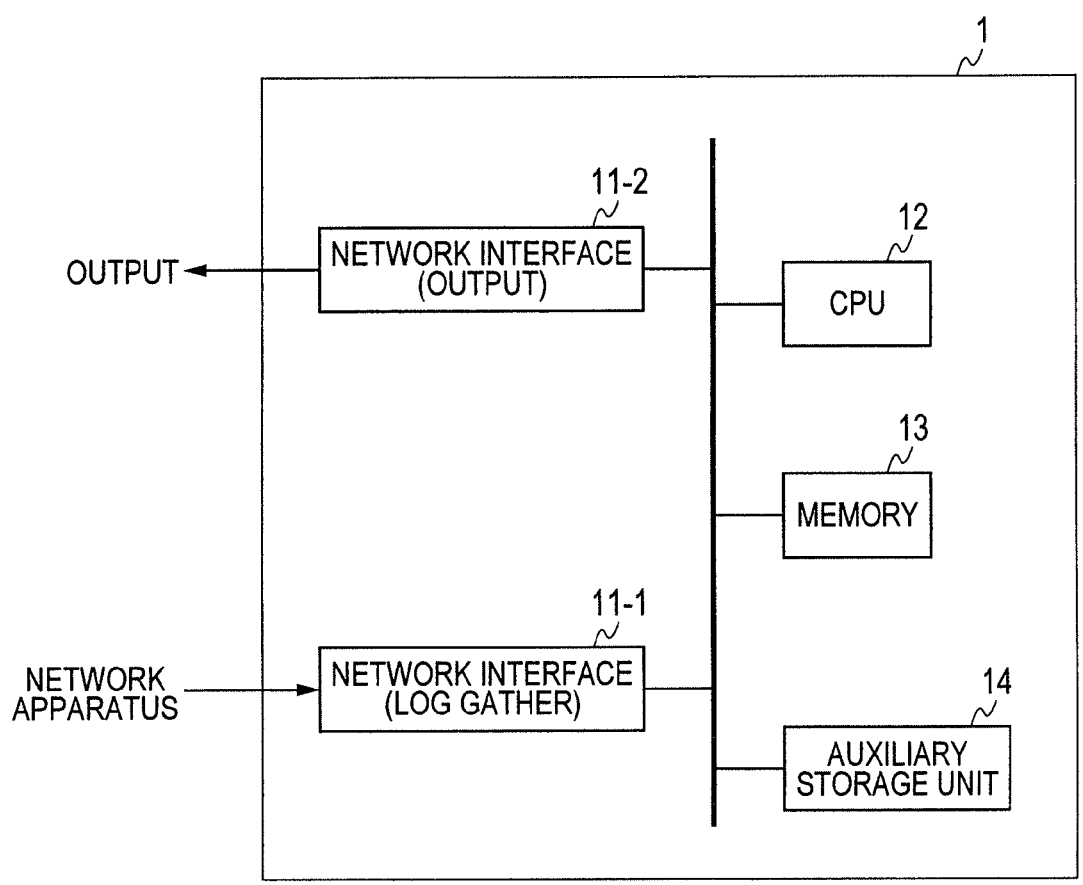
FIG. 2 is a block diagram illustrating an exemplary hardware configuration of a communication log analyzer according to the embodiment of the present invention.

FIG. 2 is a block diagram illustrating an exemplary hardware configuration of the communication log analyzer 1 according to the embodiment of the present invention.

The communication log analyzer 1 includes configuration elements such as a network interface 11-1, which collects log information from a network apparatus, a network interface 11-2, which outputs analysis result to the external unit, a CPU 12, which executes arithmetic processing such as analyzing, a memory 13, and an auxiliary storage unit 14, which has an accumulating function of the analysis results and the like.

Figure 3:
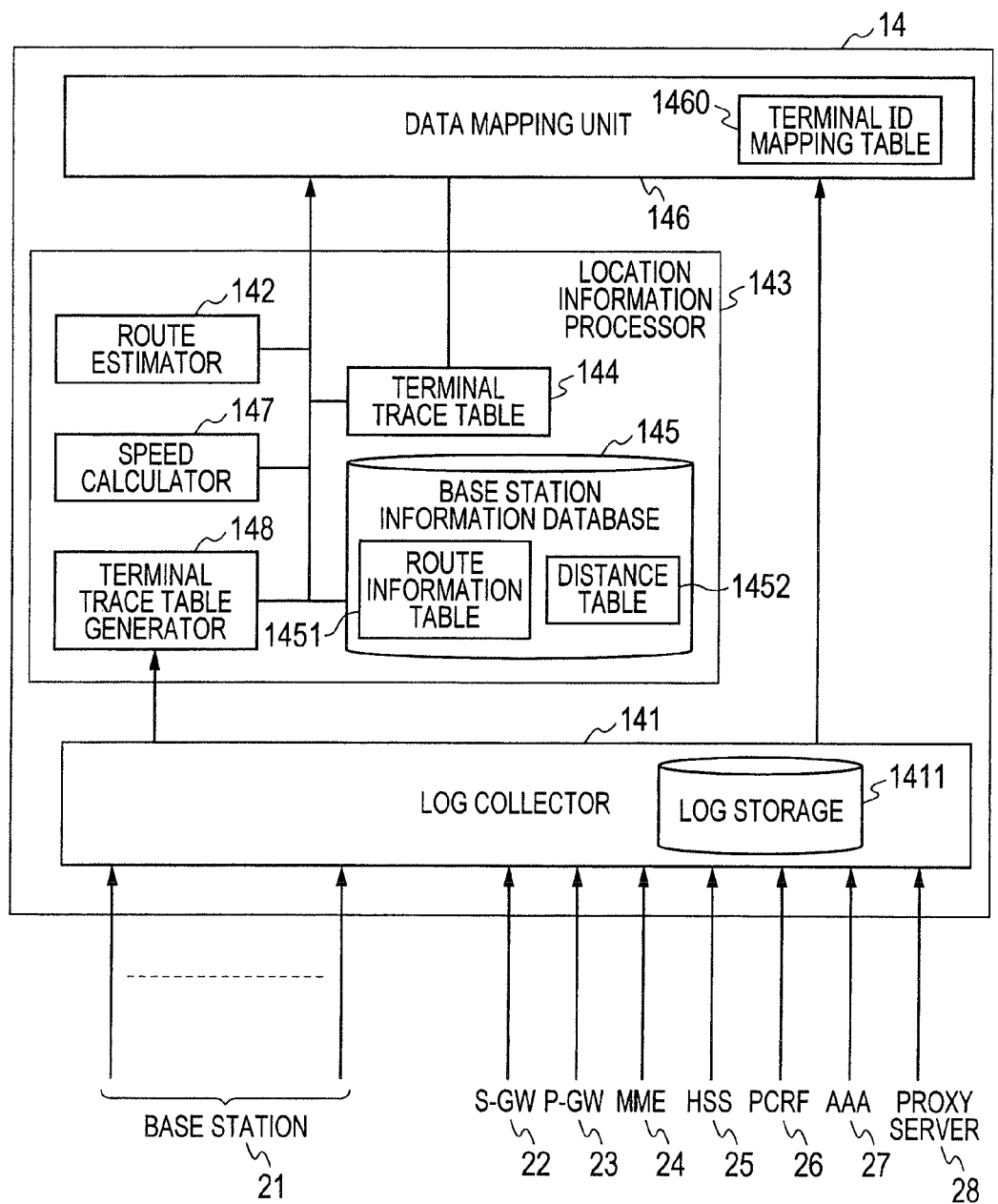
FIG. 3 is a block diagram illustrating processes in the communication log analyzer according to the embodiment of the present invention.

FIG. 3 is a block diagram illustrating processes in the communication log analyzer 1 according to the embodiment of the present invention.

The communication log analyzer 1 includes a processing block 14, which includes a log collector 141, a location information processor 143, and a data mapping unit 146.

The log collector 141 collects log information from, for example, the base station 21 and stores the log information to a log storage 1411 in the log collector 141. In the communication log collected by the base station 21, specific examples of information required for analyzing includes: information for identifying a terminal to communicate, times at which the terminal connects to a base station and begins the communication, times at which the terminal disconnects the connection to the base station and ends the communication, and information for identifying the base station, which is used to identify the location with which the terminal has had wireless communication. Apparatuses other than the base station 21, for example, the S-GW 22 has log information such as a time at which the terminal receives a Create Session Request signal to begin the communication, and a time at which the S-GW 22 sends a Delete Session Response.

The information, which is collected at the base station 21 and extracted, is transmitted to the location information processor 143. The location information processor 143 includes a route estimator 142, a speed calculator 147, a terminal trace table generator 148, a terminal trace table 144, and a base station information database 145. The base station information database 145 includes a route information table 1451 and a distance table 1452. The terminal trace table generator 148 in the location information processor 143 uses the information collected by the log collector 141 in order to generate the terminal trace table 144. The speed calculator 147 uses information of the terminal trace table 144 and the base station information database 145 in order to calculate the travel speed of the terminal. Additionally, the route estimator 142 uses the travel speed of the terminal calculated by the speed calculator 147 and information in the base station information database 145, in order to execute processing for estimating the travel route of the terminal.

The route estimation result analyzed by the location information processor 143 and extracted information from log information, which is collected from apparatuses such as the S-GW 22 and the P-GW 23, are transmitted to the data mapping unit 146. The data mapping unit 146 verifies the terminal and the times in order to associate the log information generated by respective units with communication information of the same terminal at the same time. Thus the data mapping unit 146 generates ID mapping, which is indicated as 1460, of the terminal.

FIG. 8 is a table of an exemplary configuration of the route information table 1451 stored in the base station information database 145 in the location information processor 143.

The route information table 1451 includes entries to associate the base stations 21 with line information within respective cells (within the transmission ranges of the respective base stations) which the base stations 21 each cover.

FIG. 9 is a table of an exemplary configuration of the distance table 1452 stored in the base station information database 145 in the location information processor 143.

The distance table 1452 includes distances between every two base stations 21 to be set.

FIG. 10 is a table of an exemplary configuration of the terminal trace table 144 stored in the location information processor 143.

The terminal trace table 144 is divided by the every terminal. The terminal trace table 144 includes times, when communication logs are generated, and table entries, which are configured with combinations of base stations that generate the communication log.

Figure 4:
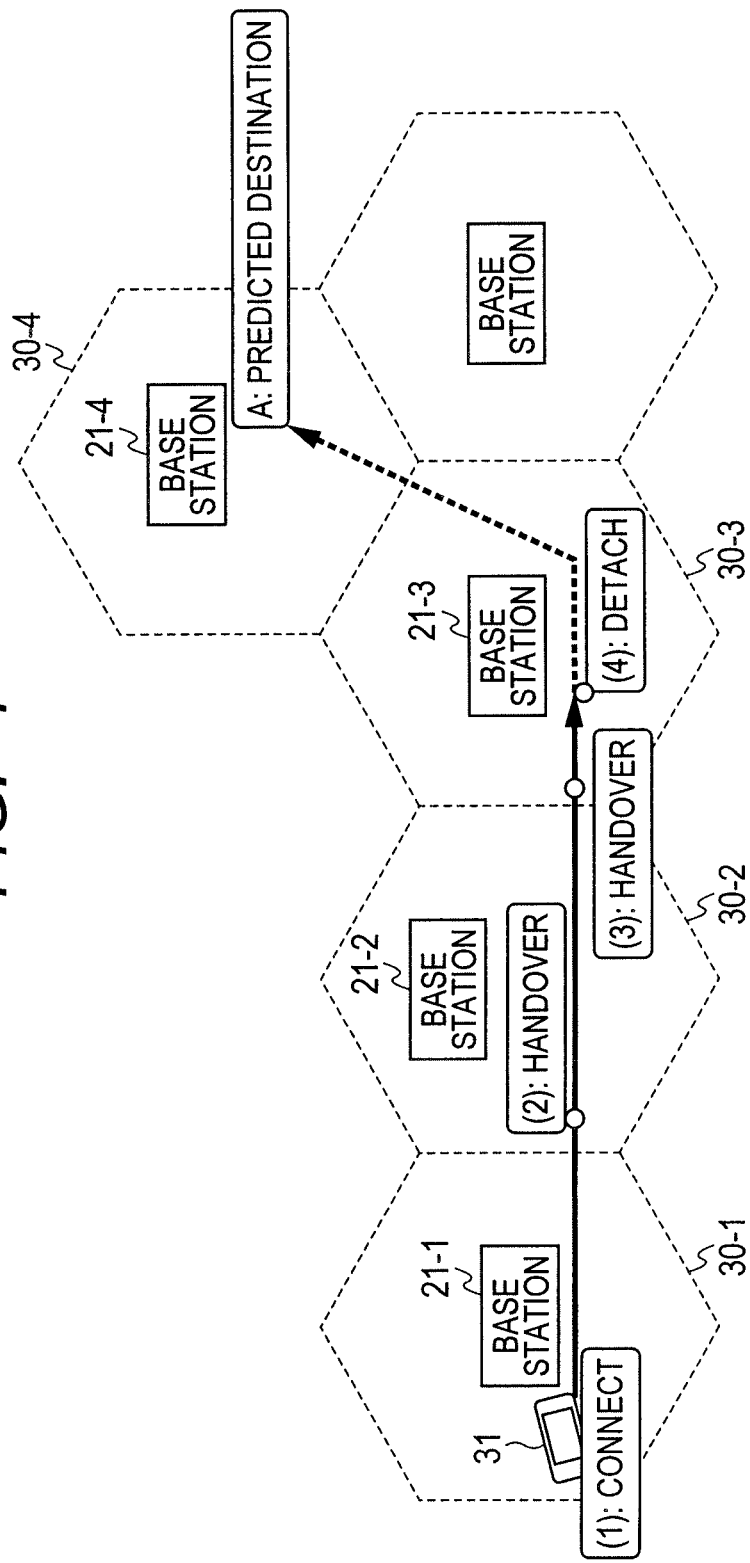
FIG. 4 is a diagram illustrating an overview of route estimation according to the embodiment of the present invention.

FIG. 4 is a diagram illustrating an overview of route estimation according to the embodiment of the present invention.

In FIG. 4, at first, the terminal 31 wirelessly connects to a base station 21-1 that covers a cell 30-1. The base station 21-1 then generates a communication log regarding the terminal 31. The terminal 31 travels while communicating so as to enter in a cell 30-2 covered by a base station 21-2. The terminal 31 executes a handover between the base stations 21-1 and 21-2 during travelling between the cells. At this time, the base station 21-2 generates a communication log regarding the terminal 31. Next, the terminal 31 executes a handover during travelling to the cell 30-3. The base station 21-3 generates a communication log regarding the terminal 31. The terminal 31 in the cell 30-3 ends the communication. At this time, the base station 21-3 generates a communication log.

Figure 11:
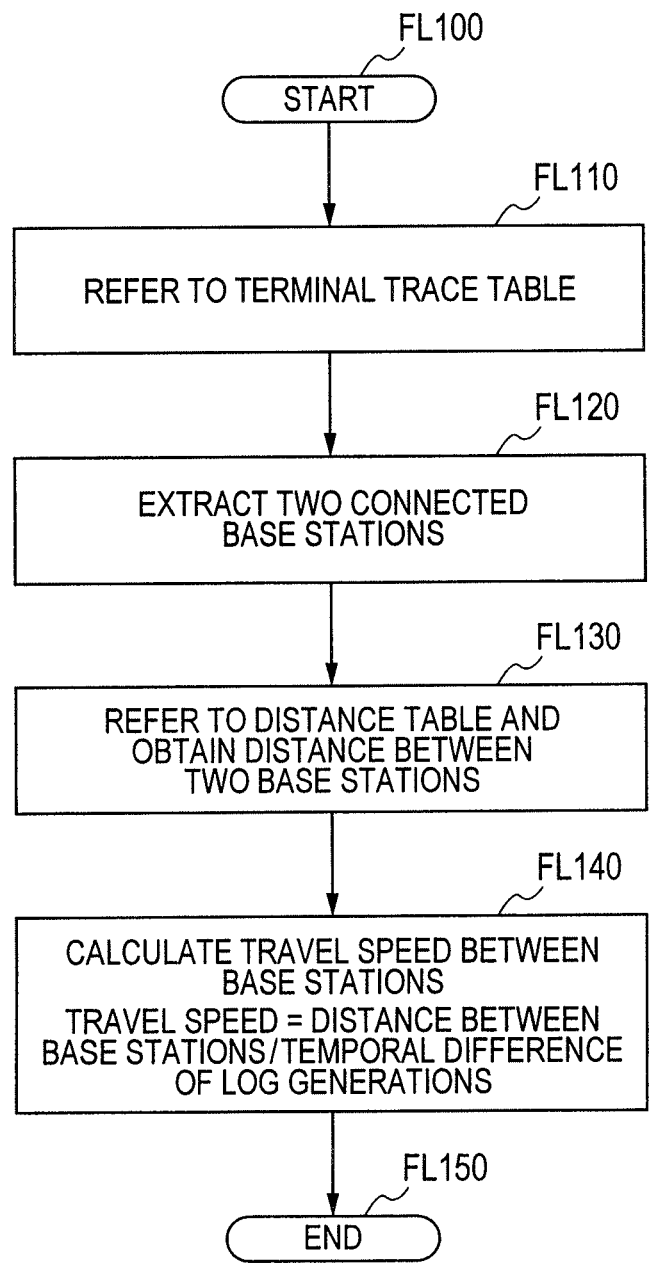
FIG. 11 is a flowchart illustrating an exemplary calculation procedure in which the communication log analyzer estimates a travel speed of the terminal.

The communication log analyzer 1 uses these communication logs in accordance with the procedure shown in FIG. 11, so as to estimate the travel route and the travel speed of the terminal 31.

Figure 12:
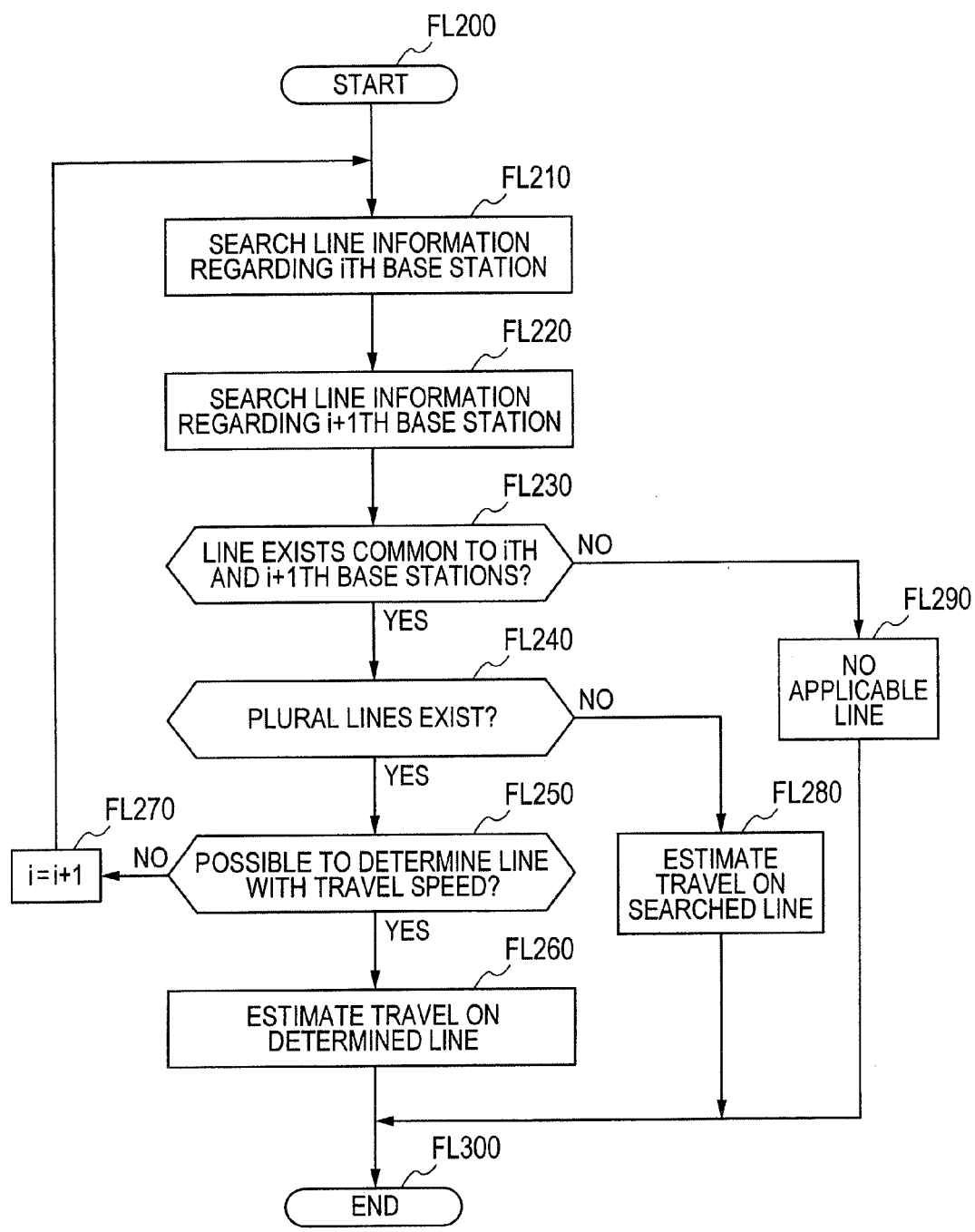
FIG. 12 is a flowchart illustrating an exemplary procedure of route estimation by the communication log analyzer.

The communication log analyzer 1 further verifies the estimated travel route and the travel speed with map information in accordance with the procedure shown in FIG. 12. This ensures estimation of the transportation method of the terminal.

The estimated travel speed, travel route, and transportation method allow to predict the destination after a certain period of time. In an example shown in FIG. 4, use of the route information table shown in FIG. 8 indicates the destination of terminal 31 in the future within an area of the cell 30-4 covered by the base station 21-4.

In FIG. 4, each of the base stations 21 covers each area shown as one of the cells 30 for simplification. However, the practical mobile communication system divides the each cell 30 into plural areas referred to as sectors. Thus one base station may cover plural areas.

Figure 5:
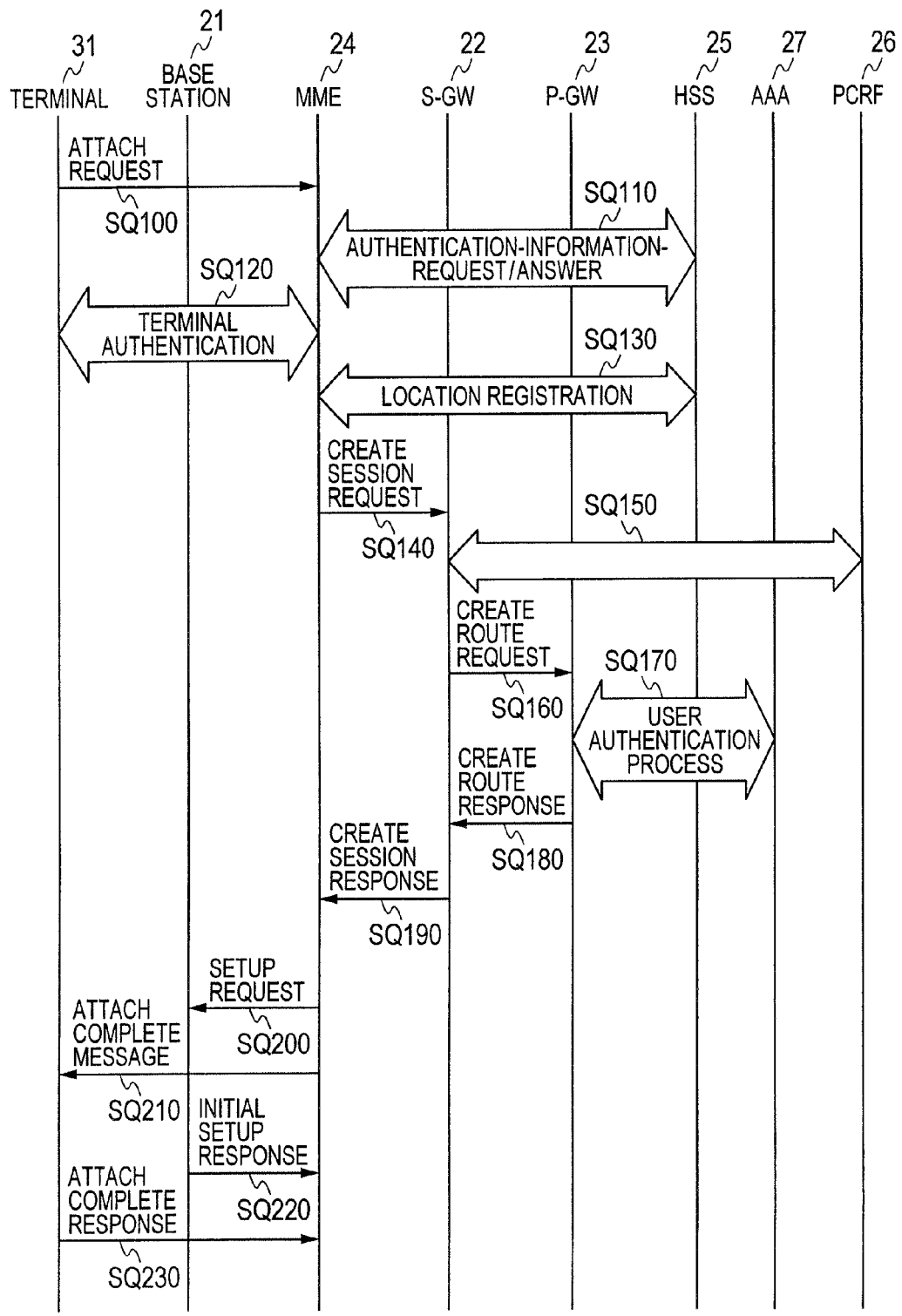
FIG. 5 is a sequence diagram illustrating an exemplary communication sequence for a terminal to connect to a network.
Figure 6:
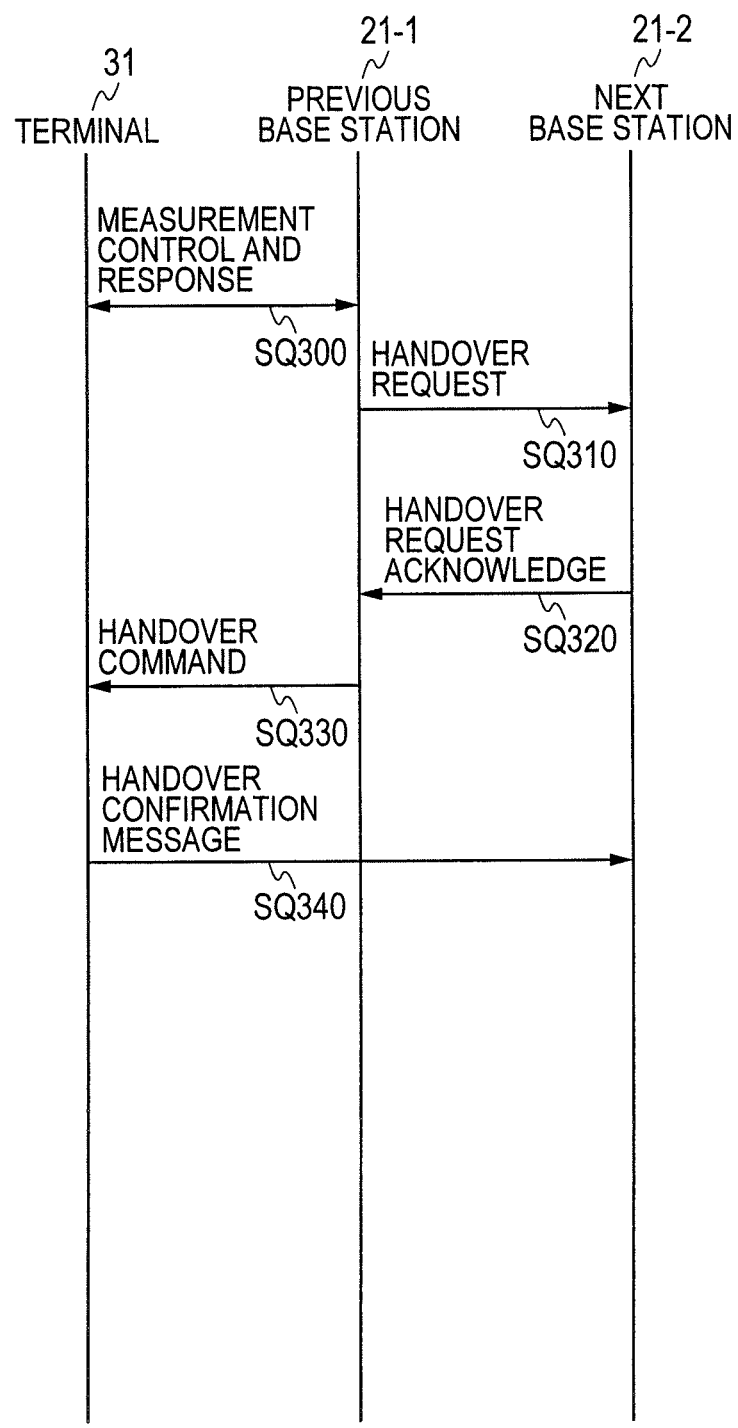
FIG. 6 is a sequence diagram illustrating an exemplary communication sequence in which the terminal travels, and then a handover to a different base station is executed.
Figure 7:
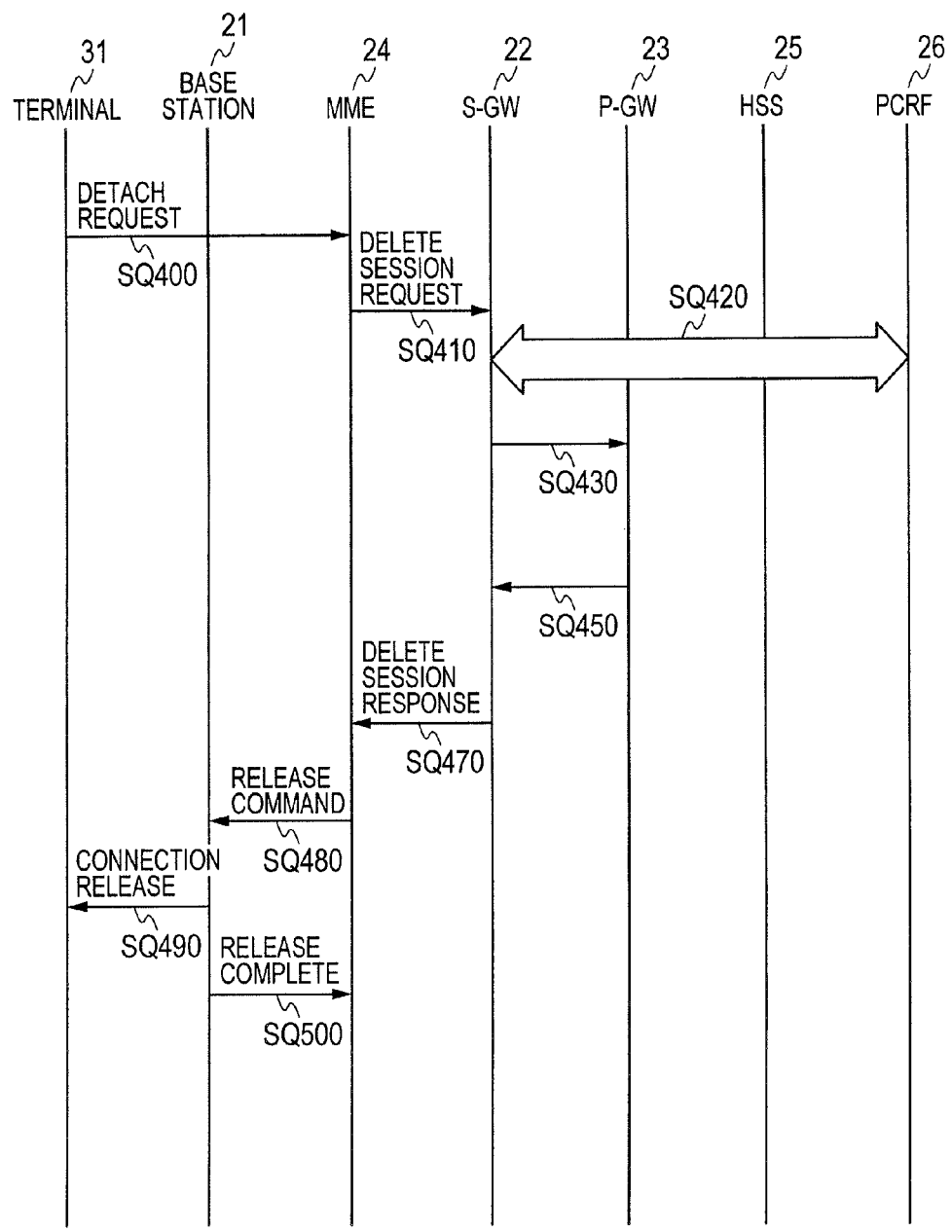
FIG. 7 is a sequence diagram illustrating an exemplary communication sequence in which the terminal is disconnected from the network.

Referring to FIG. 5 to FIG. 7, timings at which the base stations generates communication log will be described. In FIG. 5 to FIG. 7, as exemplary sequences of processing of the LTE between apparatuses such as the base stations for network connection, a handover, and network disconnection.

FIG. 5 is a sequence diagram illustrating a communication sequence for the terminal to connect to the network.

The terminal sends an Attach Request signal SQ100, to which own terminal information is set, to the base station 21. At this time, the base station 21 generate a communication log for the terminal 31 as shown in FIG. 13. The communication log includes: the terminal ID as information to identify the terminal 31; information to identify the cell as information to identify the base station; information to identify the sector; and times at which the terminal is connected to the base station, executes a handover, and is disconnected from the connection. The Attach Request signal SQ100 is sent to the MME 24 via the base station 21.

In SQ110, the MME 24 executes the Authentication-information-request/answer between the HSS 25 and the MME 24 to authenticate the terminal. In this process, the MME 24 and the HSS 25 generate communication logs regarding the terminal 31. The communication logs includes information to identify the terminal 31 and the information on the times as shown in FIG. 18.

In SQ120, the terminal 31 executes processing for Terminal Authentication between the MME 24 and the terminal 31.

In SQ130, processing for Location Registration of the terminal is executed between the MME 24 and the HSS 25.

The MME 24 sends a Create Session Request signal SQ140 to the S-GW 22. In SQ150, the S-GW 22 obtains information to create a route between the S-GW 22 and the P-GW 23 from the PCRF 26. The S-GW 22 sends a Create Route Request signal SQ160 to the P-GW 23. In SQ170, the P-GW 23 executes processing for User Authentication between the AAA 27 and the P-GW 23. At this time, the AAA 27 notifies an IP address to be assigned to the terminal 31 to the P-GW 23, while the AAA 27 generates a communication log regarding the terminal 31 as shown in FIG. 14. The communication log includes information to identify the terminal 31 such as a session ID and a user ID, the IP address assigned to the terminal, and an authentication time.

The P-GW 23 sends a Create Route Response signal SQ180 to the S-GW 22.

The MME 24 sends a Bearer Setup Request signal SQ200 between the MME 24 and the base station 21 to the base station 21. The MME 24 further sends an Attach Complete message SQ210 to the terminal 31. The attach complete signal SQ210 includes information such as the IP address to be assigned to terminal 31 issued by the AAA 27.

The base station 21 sends an Initial Setup Response SQ220 to the MME 24 in response to the Bearer Setup Request signal SQ200.

The terminal 31 sends an Attach Complete Response SQ230 to the MME 24 in response to the Attach Complete signal SQ210.

FIG. 6 is a sequence diagram illustrating a communication sequence in which a terminal travels, and then a handover to a different base station is executed.

The terminal 31 executes a Measurement Control And Response (SQ300) between the base station 21-1 and the terminal 31 in the connection. In the case where the terminal 31 travels and then the base station 21-2 with better quality of wireless access is found, the base station 21-1 sends a Handover Request (SQ310) to the base station 21-2. The base station 21-2 sends a Handover Request Acknowledge (SQ320). The base station 21-1 sends a Handover Command (SQ330) to the terminal 31. The terminal 31 sends a Handover Confirmation Message (SQ340) to the next base station 21-2. At this time, the base station 21-2 generates log information regarding the terminal 31 as shown in FIG. 13.

FIG. 7 is a sequence diagram illustrating a communication sequence in which the terminal is disconnected from the network.

The terminal 31 sends a Detach Request Signal SQ400 to the MME 24 via the base station 21.

The MME 24 sends a Delete Session Request signal SQ410 to the S-GW 22.

The S-GW 22 executes processing for Session Release (SQ420) between the PCRF 26 and the S-GW 22. The S-GW 22 in SQ430 then deletes a session between the P-GW 23 and the S-GW 22. In this process, the S-GW 22 and the P-GW 23 generates respective log information regarding the terminal 31.

The S-GW 22 sends a Delete Session Response signal SQ470 to the MME 24 in response to the Delete Session Request signal SQ410.

The MME 24 sends a Release Command signal SQ480 between the MME 24 and the base station 21 to the base station 21. The base station 21 sends a Connection Release signal SQ490 to the terminal 31. At this time, the base station 21 generates log information regarding the terminal 31 shown in FIG. 13.

The base station 21 sends a Release Complete signal SQ500 to the MME 24 in response to the Release Command signal SQ480.

FIG. 11 is a flowchart illustrating an exemplary calculation procedure in which the communication log analyzer estimates a travel speed of the terminal.

The terminal trace table regarding the terminal for which the travel speed is estimated is referred (FL110). In the terminal trace table, extracting two entries temporally next to one another extracts two connected base stations during the traveling of the terminal (FL120). A distance between the two extracted base stations is obtained using the distance table (FL130).

The distance between cells are divided by the temporal difference at which the two entries are generated. This value is an estimated value of the travel speed of the terminal (FL140).

FIG. 12 is a flowchart illustrating an exemplary procedure of route estimation by the communication log analyzer.

The terminal trace table is referred to extract a cell through which the terminal has travelled. The route information table is referred so as to refer to an entry regarding the cell. Thus line information within an area of the cell is searched (FL210).

Similarly to the FL210, the line information is searched within the area of the cell for the cell through which the terminal has travelled (FL220).

The line common to the first cell and the second cell is confirmed (FL230).

In the case where the line in common is not confirmed, the line is determined as absent (FL290). Then the processing is ended (FL300).

In the case where the lines in common are confirmed, the lines in common are determined if it is plural or singular (FL240).

In the case where plural lines are confirmed, it is determined whether use of the estimated travel speed of the terminal allows to identify the line or not (FL250).

If the estimated travel speed of the terminal is available to identify the line, the terminal is determined to be travelling on the line. Then the processing is ended (FL260).

If the estimated travel speed of terminal does not allow to identify the line, the entry regarding the next base station is searched in the route information table (FL270).

In FL240, in the case where it is determined that the single line is confirmed, the terminal is determined to be travelling on the line (FL280). Then the processing is ended (FL300).

FIG. 13 is a diagram illustrating an exemplary communication log information 2100 generated by the base station when the terminal is connected to the base station, executes a handover to the base station, and is disconnected from the base station. The log information generated by the base station includes: information to identify the base station; a terminal ID assigned to its terminal hardware; information to identify a cell to which the terminal has connected, executed a handover, and been disconnected from the connection; information to identify a sector to which the terminal has connected, executed a handover, and been disconnected from the connection; a time at which the terminal connected to the base station; a time at which the terminal executes a handover to the base station; and a time at which the terminal is disconnected from the connection to the base station. Here the base station generates communication log information of terminal ID includes, for example, a hardware ID which is uniquely assigned to each terminal. The base station generates communication log information 2100 based on the timings as described above using FIG. 5 to FIG. 7.

The generating procedure of the terminal trace table 144 shown in FIG. 10 will be described. The communication log analyzer 1 shown in FIG. 3 includes the terminal trace table generator 148 in the processing block 14. The terminal trace table generator 148 extracts the communication log 2100 shown in FIG. 13, which is generated by the base station 21, from the log storage 1411. The terminal trace table generator 148 also extracts the terminal ID information, which is included in the communication log 2100 (FL510). One of times at which the communication log 2100 generates, namely, the connection time set to communication log 2100, the handover time, and the detach time, is extracted. The extracted time is set to the terminal trace table 144 (FL520). Further, the cell information and the sector information shown in FIG. 13 are set to the terminal trace table 144 (FL530).

FIG. 14 is a diagram illustrating an exemplary communication log information 2700 generated by an AAA server. The communication log information 2700 generated by the AAA server includes information to identify the AAA server that generates the log, the session ID, the user ID, the IP address assigned to the terminal, and a time at which the user is authenticated.

FIG. 16 is a diagram illustrating an exemplary communication log information 2300 generated by the P-GW. The log information generated by the P-GW includes information to identify the P-GW that generates the log, information of a GRE key to identify the tunnel established between the S-GW and the P-GW, a session ID to identify the session, and the generation time of the log.

FIG. 17 is a diagram illustrating an exemplary communication log information 2200 generated by the S-GW. The communication log information 2200 generated by the S-GW includes information to identify the S-GW, the terminal ID, information of a GRE key to identify the tunnel established between the S-GW and the P-GW, and the generation time of the log.

FIG. 18 is a diagram illustrating an exemplary communication log information 2500 generated by the HSS. The log information 2500 generated by the HSS includes information to identify the HSS, the terminal ID, and the generation time of the log.

FIG. 19 is a table of an exemplary configuration of the table for mapping terminal information 1460. The table for mapping terminal information 1460, in the network connection procedure of the terminal 31 described in FIG. 5, executes ID mapping of each unit that transmits and receives messages. In FIG. 19, the terminal ID shown in FIG. 13 in the log information 2100 generated by the base station 21, the terminal ID and the GRE key shown in FIG. 17 in the log information 2200 generated by the S-GW 22, the GRE key and the terminal IP address shown in FIG. 16 in the log information 2300 generated by the P-GW 23, are used to execute mapping. The exemplary mapping includes mapping of the terminal ID as a hardware ID assigned to the terminal and the IP address assigned by the AAA 27. This mapped information allows to associate log information respectively generated by the base station 21, the S-GW 22, and the P-GW 23 with each other regarding the same terminal.

FIG. 15 is a diagram illustrating an exemplary communication log information 2800 generated by a proxy server. The communication log information 2800 is generated by the proxy server when the terminal 31 is connected to the Web server 29, the HTTP session between the terminal 31 and the Web server 29 is accepted, and the HTTP session is ended. The proxy server generates the communication log information, which includes information to identify the proxy server that generates the log, the terminal ID, the destination information, the accepted time of the HTTP session, and the ended time. Here information set to the terminal ID is, for example, the IP address of the transmission source that is set to the packets, which are transmitted to the Web server by the terminal. The destination is, for example, Uniform Resource Locator (URL).

Figure 20:
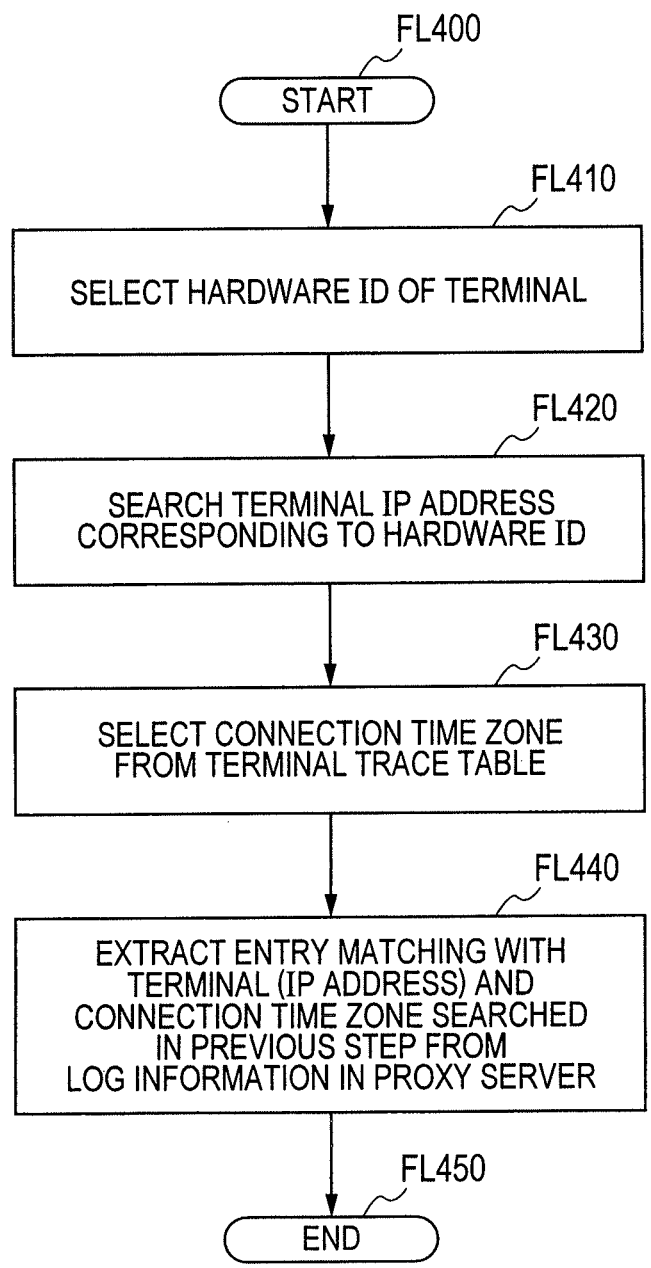
FIG. 20 is a flowchart illustrating an exemplary procedure to associate a travel route of the terminal and a network connection destination of the terminal.

FIG. 20 is a flowchart illustrating an exemplary procedure to associate a travel route of the terminal and a network connection destination of the terminal through a network.

The communication log analyzer 1 includes the data mapping unit 146 in the processing block 14. The data mapping unit 146 uses the table for mapping terminal information 1460 shown in FIG. 19 in order to select the hardware ID of the terminal, which is an object to associate (FL410). The data mapping unit 146 searches the IP address assigned to the terminal corresponding to the hardware ID using the associated log information shown in FIG. 13 to FIG. 18 (FL420). Specifically, the table for mapping terminal information 1460 shown in FIG. 19 includes: the hardware ID as the terminal ID of the communication log 2100 generated by the base station 21 shown in FIG. 13; the GRE key as the terminal ID of the communication log 2200 generated by the S-GW 22 shown in FIG. 17; and the assigned IP address as the terminal ID of the communication log 2300 generated by the P-GW 23 shown in FIG. 16.

The data mapping unit 146 uses the terminal trace table 144 shown in FIG. 10 in order to select a time zone when the terminal connects to the base station 21 (FL430).

The data mapping unit 146 uses the proxy log information 2800 shown in FIG. 15 as follows. In the step FL420, the IP address associated with the hardware ID of the terminal is used to extract the log information including the HTTP session accepted time and the HTTP session ended time that are matched with the time zone when the terminal was connected. This extracts the destination information in the time zone (FL440).

As described above, the procedure according to the embodiment associates the connection location or the travel route of the terminal with the network connection destination of the terminal.

As an effect of associating the connection location or the travel route of the terminal with the network connection destination of the terminal, an example of implemented traffic offload will be described.

Figure 21:
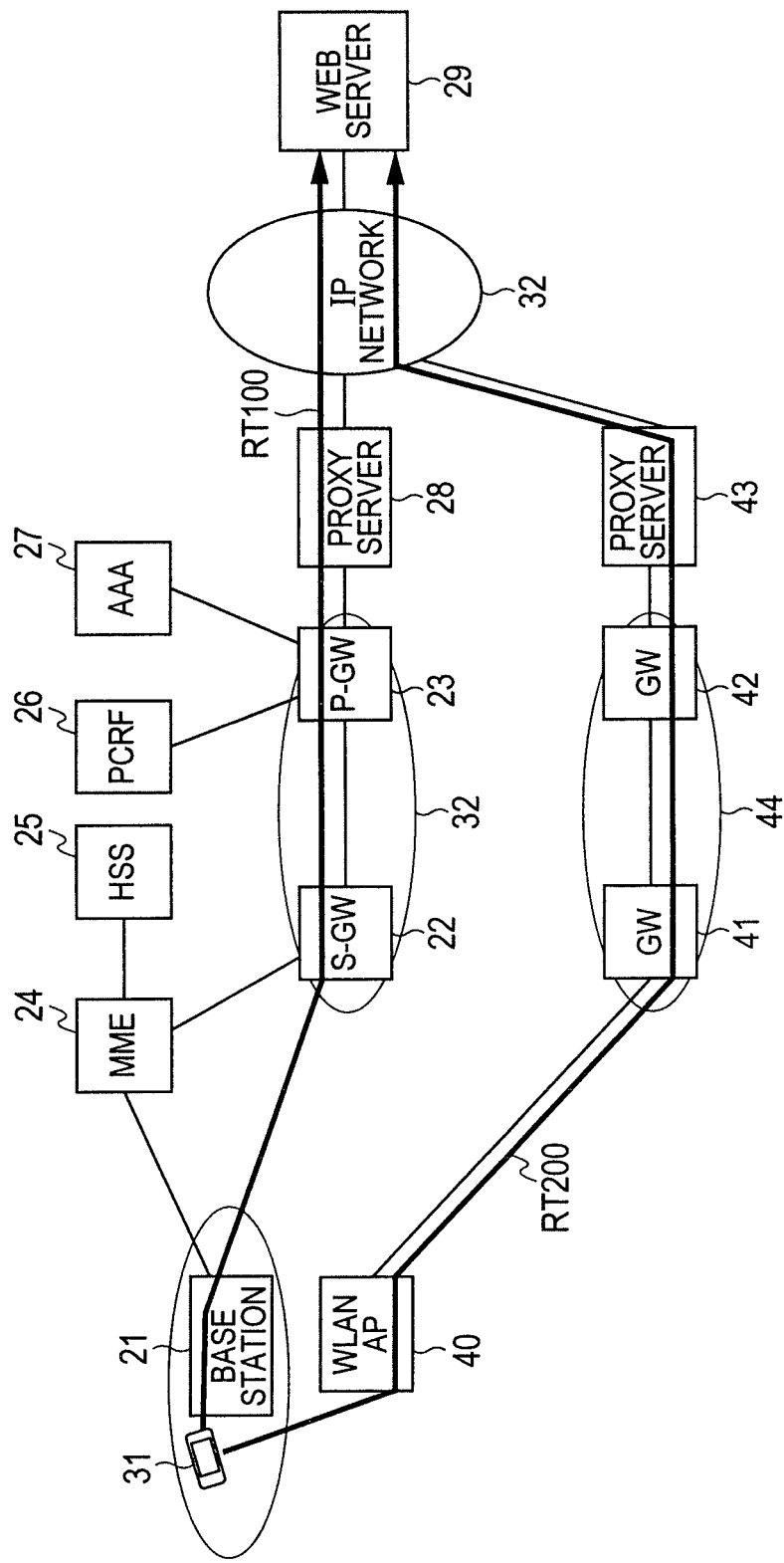
FIG. 21 is a diagram illustrating an exemplary traffic offload via wireless LAN.

FIG. 21 is a diagram illustrating an example of traffic offload via wireless LAN.

In an example in FIG. 21, an ordinary connection path from the terminal 31 to the Web server 29 is shown as RT100. Here, in a method according to the embodiment of the present invention, when it is determined that the number of connection of the base station 21 to the Web server 29 or the traffic volume is large, a path RT200 is set as a path to bypass the traffic. In the path RT200, the terminal 31 connects to the access point 40 of wireless LAN and then connects to the Web server 29 through the Internet 32 via the wired network 44.

Figure 22:
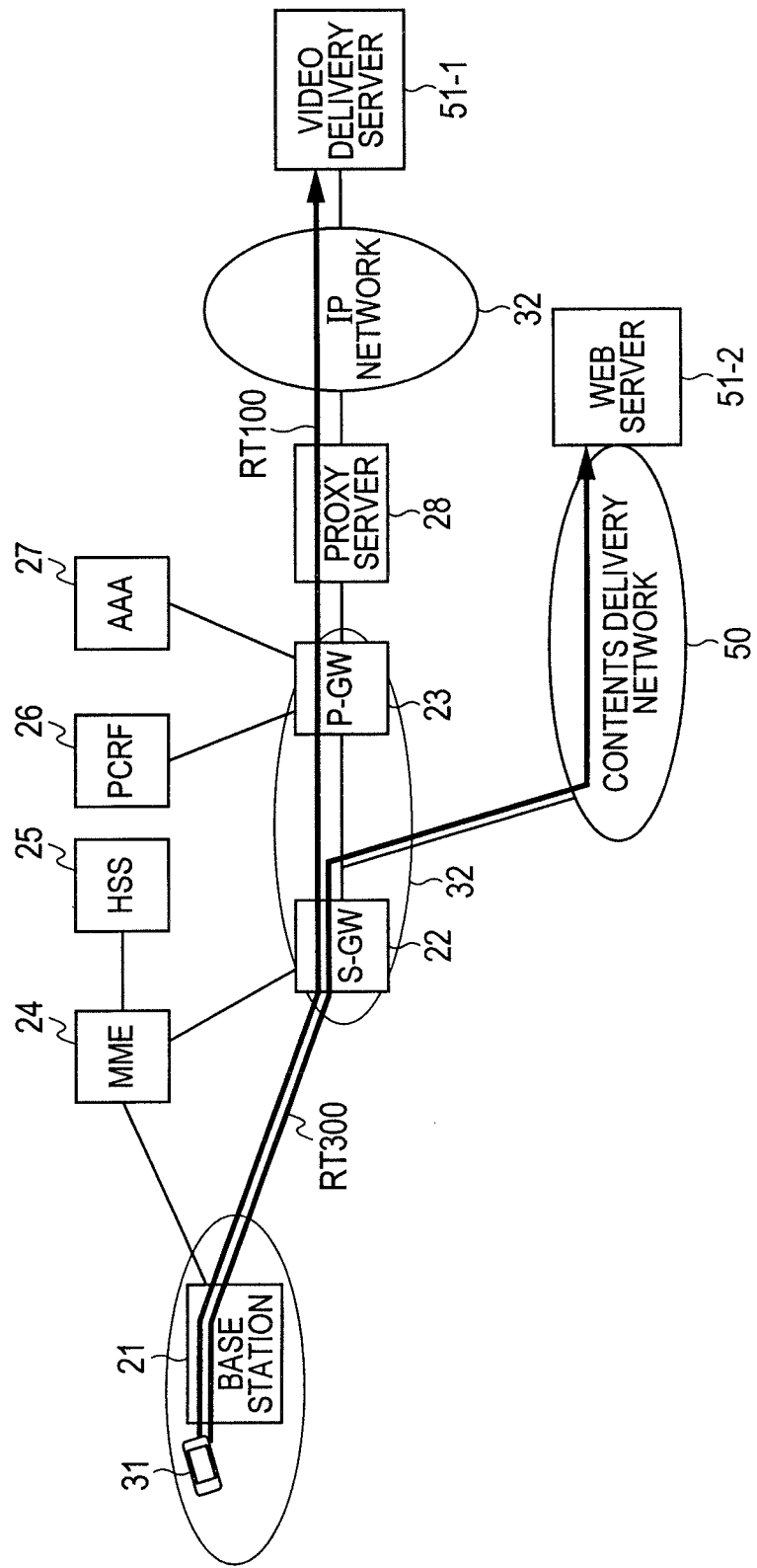
FIG. 22 is a diagram illustrating an exemplary traffic offload through a contents delivery network.

FIG. 22 is a diagram illustrating an example of traffic offload through a contents delivery network.

The ordinary connection path between the terminal 31 and the video delivery server 51-1 is shown as the RT100. Here, in method according to the embodiment of the present invention, when it is determined that the number of connection of the base station 21 to the video delivery server 51-1 or the traffic volume is large, a path RT300 that includes the contents delivery network 50 is set so as to reduce the traffic of the ordinary connection path including the P-GW 23 and the IP Network 32.

The embodiment according to the present invention allows to associate the travel route and the connection destination of the terminal. This ensures collection of necessary information for network design in order to perform the traffic offload to reduce load of the wireless access network.

Further, this allows to recommend an appropriate connection destination corresponding to the travel destination of the users of the communication. Specifically, in the case where wireless LAN connection service on train is provided, this enables the communication log analyzer to provide the analysis result as follows. For users who have repeatedly used the line in the past and connected to the network, the wireless LAN connection service on train is recommended to use instead of the network via wireless access network.

Related attribution (such as age and gender) of the users of the communication, the location of the communication by the users, and the travel route may be associated to obtain information that is available to provide service corresponding to the location.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

The invention claimed is:

1. A network system comprising:
    a plurality of communication units, wherein the plurality of communication units include a terminal, a base station that wirelessly connects to the terminal, and a proxy server that is connected to a network when the terminal connects to a WEB server;
    a communication log analyzer configured to connect the plurality of communication units via the network, and
    means for setting a path to bypass traffic to the terminal in accordance with a traffic volume between the base station and the WEB server, wherein:
    the plurality of communication units generate communication log information, and transmit the generated communication log information to the communication log analyzer, and
    the communication log analyzer is configured to:
        extract communication log information of communication between the base station and the terminal from the communication log information received from the base station,
        obtain a connection location or a travel route of the terminal based on the communication log information between the base station and the terminal,
        extract communication log information including information of the WEB server from the communication log information received from the proxy server,
        estimate at least one of the travel route and a travel method from at least one of route information, travel speed, and travel direction, the route information including information on routes within each of transmission ranges of the respective base stations, and
        associate the communication log information including the information of the WEB server with the travel route and the travel method.

2. The network system according to claim 1, wherein the communication log analyzer is configured to extract at least one of a first communication log information and a second communication log information, the first communication log information being generated by the base station when the terminal connects to the base station, the second communication log information being generated by the base station when the terminal disconnects the connection to the base station.

3. The network system according to claim 2, wherein the communication log analyzer is configured to use the extracted communication log information and distance information between the respective base stations so as to estimate a travel distance of the terminal.

4. The network system according to claim 3, wherein the communication log analyzer is configured to: calculate a travel time from a generation time in the extracted communication log information, the travel time being required for the terminal to travel between the base stations; and estimate the travel speed of the terminal from the travel distance and the travel time.

5. A communication log analyzer for analyzing communication log information of a communication unit within a network, the communication log analyzer comprising:
    a communication log collector configured to collect communication log information received from the communication unit, wherein the communication unit is a terminal, a base station that wirelessly connects to the terminal, or a proxy server that is connected to the network when the terminal connects to a WEB server;
    means for setting a path to bypass traffic to the terminal in accordance with a traffic volume between the base station and the WEB server;
    a communication log extractor configured to:
        extract communication log information of communication between the base station and the terminal from the communication log information received from the base station,
        obtain a connection location or a travel route of the terminal based on the communication log information between the base station and the terminal, and
        extract communication log information including information of the WEB server from the communication log information received from the proxy server; and
    a location information processor configured to:
        estimate at least one of the travel route and a travel method from at least one of route information, travel speed, and travel direction, the route information including information on routes within each of transmission ranges of the respective base stations, and
        associate the communication log information including the information of the WEB server with the travel route and the travel method.

6. The communication log analyzer according to claim 5, wherein
    the communication log extractor is configured to extract at least one of a first communication log information and a second communication log information, the first communication log information being generated by the base station when the terminal connects to the base station, the second communication log information being generated by the base station when the terminal disconnects the connection to the base station.

7. The communication log analyzer according to claim 6, further comprising a storage configured to store distance information between the respective base stations, wherein
    the location information processor uses the extracted communication log information and the distance information so as to estimate a travel distance of the terminal.

8. The communication log analyzer according to claim 7, wherein
    the location information processor is configured to: calculate a travel time from a generation time in the extracted communication log information, the travel time being required for the terminal to travel between the base stations; and estimate the travel speed of the terminal from the travel distance and the travel time.

9. The communication log analyzer according to claim 8, wherein the storage is configured to include the route information including information on routes within each of transmission ranges of the respective base stations.

* * * * *